US006598227B1

United States Patent
Berry et al.

(10) Patent No.: US 6,598,227 B1
(45) Date of Patent: Jul. 22, 2003

(54) VEHICLE ENTERTAINMENT SYSTEM HAVING MULTIPLE DOWNLOAD CHANNELS

(75) Inventors: Dickey J. Berry, La Verne, CA (US); Joseph J. Renton, Orange, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/275,570

(22) Filed: Mar. 24, 1999

(51) Int. Cl.[7] .......................... H04N 7/18; H04N 7/173
(52) U.S. Cl. ............................ 725/77; 725/76; 725/93
(58) Field of Search .......................... 725/75–77, 91, 725/92, 94, 95; 707/9, 10; 711/171, 172, 173

(56) References Cited

U.S. PATENT DOCUMENTS

| | | | | |
|---|---|---|---|---|
| 4,897,714 A | * | 1/1990 | Ichise et al. ................... 725/76 |
| 5,289,272 A | * | 2/1994 | Rabowsky et al. ............. 725/76 |
| 5,761,417 A | * | 6/1998 | Henley et al. ................. 725/94 |
| 5,801,751 A | * | 9/1998 | Sklar et al. .................... 725/76 |
| 5,808,607 A | * | 9/1998 | Brady et al. ................. 725/114 |
| 5,929,895 A | * | 7/1999 | Berry et al. .................... 725/77 |
| 5,959,596 A | * | 9/1999 | McCarten et al. ............. 725/77 |
| 5,973,722 A | * | 10/1999 | Wakai et al. ................... 725/76 |
| 5,987,008 A | * | 11/1999 | Simpson et al. ............. 370/236 |
| 6,014,381 A | * | 1/2000 | Troxel et al. .................. 725/76 |
| 6,058,288 A | * | 5/2000 | Reed et al. ................. 455/3.06 |
| 6,249,913 B1 | * | 6/2001 | Galipeau et al. ............... 725/77 |
| 6,289,012 B1 | * | 9/2001 | Harrington et al. .......... 370/389 |
| 6,378,130 B1 | * | 4/2002 | Adams ........................... 725/93 |

* cited by examiner

Primary Examiner—John Miller
Assistant Examiner—Scott Beliveau
(74) Attorney, Agent, or Firm—Nathan O. Jensen; Kyle Eppele

(57) ABSTRACT

A vehicle entertainment system distributes an executable program in more than one channel of a modulated RF signal by using a plurality of download lines provided between the system file server and the RF modulator. The multiple download lines permit a passenger seat that missed the time window for downloading an executable program to request and download the executable program even before the first download has completed. The multiple download lines also permit downloads of different executable programs to take place at the same time. The vehicle entertainment system further includes a dedicated download processor and a buffer. The dedicated download processor is provided to reduce the processing load of the file server processor, in particular, to take over the task of generating a continuous stream of data responsive to a download request and supplying them to the RF modulator. The buffer provides the dedicated download processor an area where previously retrieved executable program may be stored for subsequent fast access.

6 Claims, 10 Drawing Sheets

VEHICLE ENTERTAINMENT SYSTEM HAVING MULTIPLE DOWNLOAD CHANNELS

BACKGROUND OF THE INVENTION

1. Field of the Invention

The present invention relates to a vehicle entertainment system, and more particularly, to an in-flight entertainment system that delivers video, audio, and application software to passenger seats using a modulated radio-frequency (RF) signal having a plurality of channels.

2. Description of the Related Art

A conventional in-flight entertainment system typically employs a single RF cable to deliver video signals to the passenger seats. To deliver different video signals over multiple channels so that passengers can be provided with viewing choices, a video modulator is used. In a typical arrangement, the video modulator is connected to multiple video cassette players that generate a plurality of different NTSC video streams. The video modulator receives these video streams and modulates each different NTSC video stream into a frequency band corresponding to one of the multiple channels.

In the above-described system, each passenger seat is equipped with a seat controller card (SCC) that is tunable to the frequency bands corresponding to the multiple channels. Once the seat controller card is tuned to receive at a particular frequency band, it demodulates the RF signal received and sends the demodulated signal to a seat display unit for viewing.

Each seat controller card operates under the control of an application program that is downloaded from a system controller, that is commonly referred to as a cabin file server (CFS), but is loaded and run locally at its corresponding passenger seat location. The download path between the cabin file server and the passenger seat location includes the same video modulator and RF cable that are used to distribute the modulated NTSC video streams. The download process is illustrated in FIG. 1.

At the start of this process, preliminary messages are transmitted back and forth from the seat controller card and the cabin file server over an ARCNET network, which is a token passing bus using RS-485 protocol. First, the seat controller card requests an application software from the cabin file server, and the cabin file server replies with a file identifier associated with the requested application software. The seat controller card then requests a download using the file identifier, and the cabin file server responds with an acknowledgment and a message to "prepare for download."

The download of data occurs over a download line connecting the cabin file server and the video modulator, and the single RF cable. First, the application program is retrieved by the cabin file server from its storage device, supplied to the video modulator in a synchronous data stream over the download line, modulated into a frequency band corresponding to one of the multiple channels of the video modulator, and distributed in common to the seat controller cards over the single RF cable. Then, the seat controller cards tune to the frequency band corresponding to the channel in which the application software is carried, demodulate the received RF signal, and load the application software into their resident memory for execution.

The conventional in-flight entertainment system described above operates adequately when the requests from the seat controller cards to download the application software are synchronized, i.e., when the requests are made substantially at the same time. However, when one of the requests is not synchronized with the others, that request will have to wait until the application software has finished downloading before it can start downloading another copy of the application software.

A partial solution to the above problem is to establish a time window of a predetermined length, e.g., 500 msec in FIG. 1, to provide the late requestor a 500 msec time window of opportunity to issue its request. However, as noted, this is only a partial solution in that requests made after this time window must still wait before it can start downloading.

Another limitation of the above-described system is that, once the cabin file server processor begins processing the download request, it must do so continuously until the downloading is complete. This is because the seat controller card uses for its inputs a synchronous protocol, known as HDLC (High Level Data Link Control which implements layer 2 of the OSI model), and requires the data stream generated by the cabin file server to be continuous. As a result, the cabin file server processor is required to continuously, without breaks, transmit data into its download line from beginning of the transmission to the end of the transmission, and has reduced flexibility in performing other tasks in parallel with the download process.

Also, when multiple requests for download are made by the seat controller cards at different times, the cabin file server processor is unable to accommodate these requests in parallel. It must queue the requests and execute them one by one. When this happens, the cabin file server processor becomes continually burdened with downloading tasks, leaving it less processing power to handle other tasks.

SUMMARY OF THE INVENTION

An object of the invention is to provide a vehicle entertainment system that distributes an executable program in more than one channel of a modulated RF signal. This resolves the download synchronization problems because an executable program may be accessed at two different times by different passenger seats.

Another object of the invention is to provide a vehicle entertainment system having multiple download lines between the cabin file server and the video modulator. By having multiple download lines, a passenger seat that missed the time window for downloading an executable program is permitted to request and download the executable program even before the first download has completed. The multiple download lines provides an additional advantage of permitting downloads of different executable programs to take place at the same time.

Still another object of the invention is to provide a vehicle entertainment system having a dedicated download processor and a buffer. The dedicated download processor is provided to reduce the processing load of the main processor, in particular, to take over the task of generating a continuous stream of data responsive to a download request and supplying them to the video modulator. The buffer provides the dedicated download processor an area where previously retrieved executable program may be stored for subsequent fast access.

Still a further object of the invention is to provide a vehicle entertainment system having an executable program stored in a MPEG-format that is subjected to a quadrature amplitude modulation before it is downloaded to the video modulator. The MPEG compression and the quadrature amplitude modulation permit multiple executable programs to be carried on a single channel of the RF modulated signal. This has the effect of dividing a single channel of the RF modulated signal into a plurality of sub-channels, so if the same executable program is carried in more than one sub-channel in a time-staggered manner, the download requests of this program can be fulfilled at different times. Further, since the sub-channels may contain different executable programs, the MPEG compression and the quadrature amplitude modulation provide an additional advantage of permitting downloads of different executable programs to take place at the same time.

Yet another object of the invention is to provide a method of managing download requests of executable programs in a vehicle entertainment system. In this method, a download buffer is examined to see if a requested program is stored therein. If it is, the requested program is retrieved from the download buffer using a dedicated download processor. This method improves the download speeds for subsequent download requests for the same executable program and frees up the main processor to handle other tasks.

Additional objects, features and advantages of the invention will be set forth in the description of preferred embodiments which follows.

BRIEF DESCRIPTION OF THE DRAWINGS

The various features and advantages of the present invention may be more readily understood with reference to the following detailed description taken in conjunction with the accompanying drawings, and in which.

The accompanying drawings, which are incorporated in and constitute a part of the specification, illustrate presently preferred exemplary embodiments of the invention, and, together with the general description given above and the detailed description of the preferred embodiments given below, serve to explain the principles of the invention.

DETAILED DESCRIPTION OF THE PREFERRED EMBODIMENTS

A description of the vehicle entertainment system 100 of the preferred embodiment is given below. Although an aircraft is depicted below, the system according to the invention may be implemented in any vehicle having a passenger entertainment system. Some of the examples include buses, boats, trains, and jetfoils. Also, a description of some of the details of the vehicle entertainment system 100 has been omitted for clarity, and such details may be found in co-pending U.S. patent application Ser. No. 09/085,180, filed May 26, 1998, entitled "Passenger Entertainment System, Method and Article of Manufacture Having Improved Area Distribution Equipment," the contents of which are incorporated by reference herein.

Figure 2:
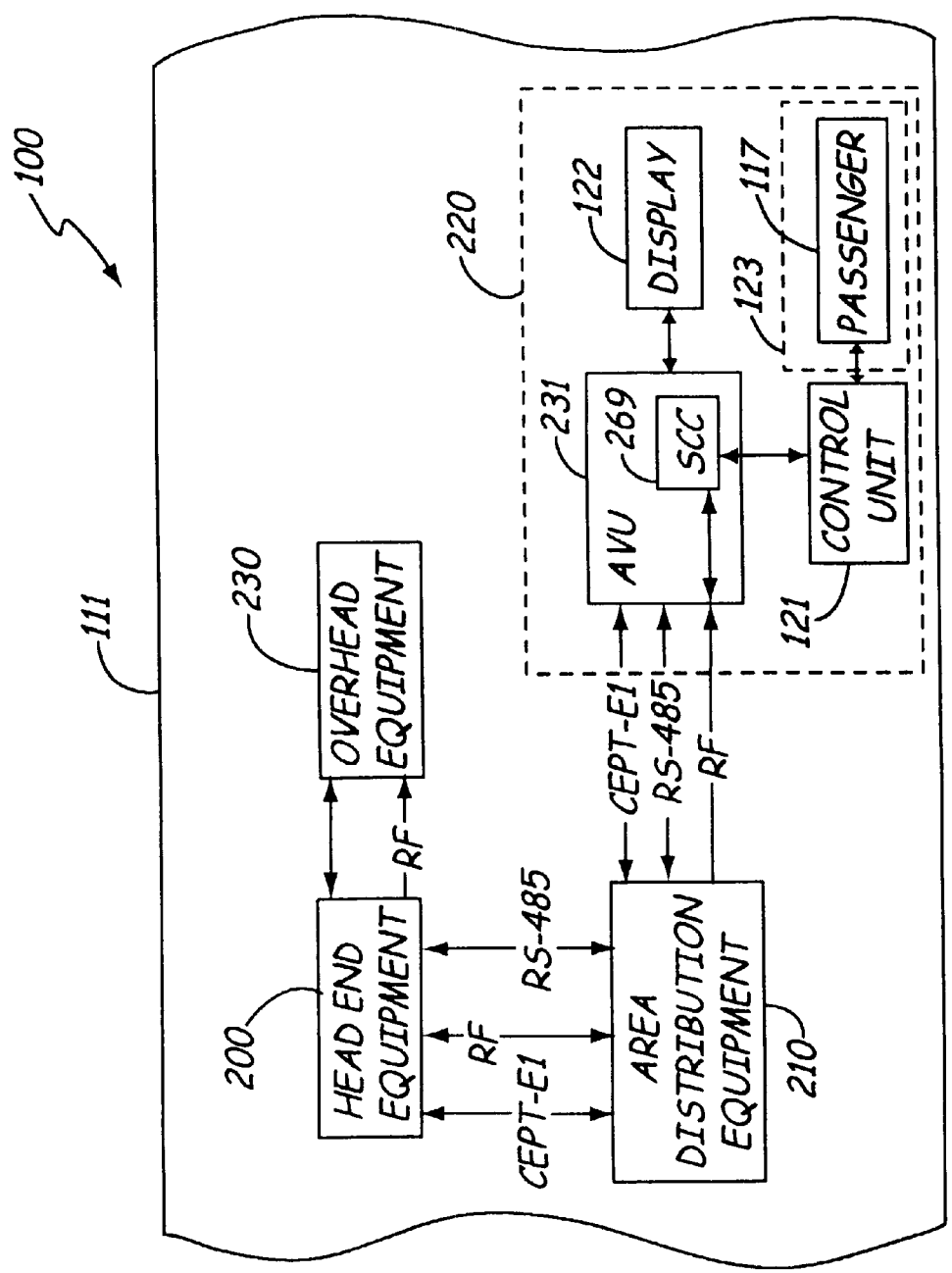
FIG. 2 illustrates an operational environment depicting a vehicle entertainment system.

FIG. 2 illustrates an operational environment depicting an exemplary vehicle entertainment system 100 in accordance with a preferred embodiment. The operational environment depicts a flight of an aircraft 111 employing the vehicle entertainment system 100. The vehicle entertainment system 100 is comprised of four main functional areas including head end equipment 200, area distribution equipment 210, seat group equipment 220, and overhead equipment 230. The head end equipment 200 provides an interface to external hardware and operators. The area distribution equipment 210 routes signals to and/or from the head end equipment 200, the seat group equipment 220, and the overhead equipment 230, depending upon the type of service provided to or requested by the passengers. The seat group equipment 220 contains a plurality of audio-video units (AVUs) 231. In each AVU 231, there is one to three seat controller cards (SCCs) 269. In FIG. 2, only one AVU 231 and one SCC 269 are illustrated for simplicity. One SCC 269 is provided to each passenger 117 seated in seat 123. The overhead equipment 230 includes video monitors and/or projectors and bulkhead screens or displays for displaying movies and other information.

A handheld or fixed passenger control unit 121 and a seatback screen display 122 (or seat display unit (SDU) 122) are provided at each passenger seat 123 and permit the passengers 117 to interface to the system 100. The passenger control unit 121 is used to control downloading of movies for viewing, select audio channels for listening, initiate service calls to flight attendants, order products and services, and control lighting. The passenger control unit 121 is also used to control game programs that are downloaded and played at the passenger seat 123. The passenger control unit 121 uses carbon contacts in lieu of conventional membrane switches. This provides for more reliable operation.

Figure 3:
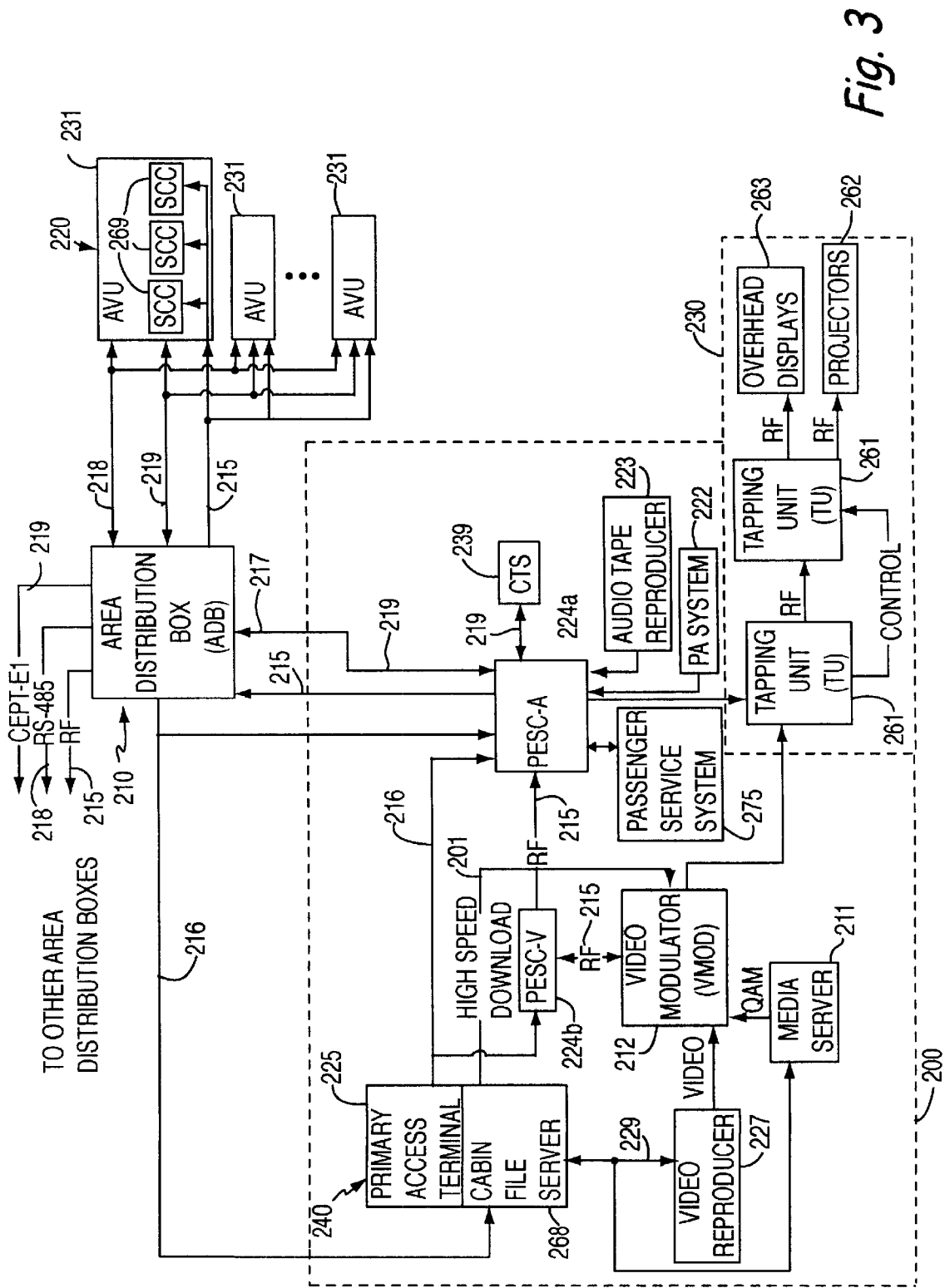
FIG. 3 is a block diagram of the vehicle entertainment system.

FIG. 3 is a detailed illustration of the vehicle entertainment system 100. In FIG. 3, the head end equipment 200 comprises a system control unit 240 which contains both a primary access terminal (PAT) 225 and a cabin file server (CFS) 268. The primary access terminal 225 provides the operator interface to the system 100, and the cabin file server 268 is the system controller, which controls many of the system functions and stores the system configuration database and the application software. The cabin file server 268 communicates to other components of the system 100 via the ARCNET network 216.

The head end equipment further comprises a video modulator 212, manufactured by Olsen Technologies, for example, that is coupled to the cabin file server 268 by a plurality of high-speed download (HSDL) lines 201 (only one of which is shown in FIG. 3). The video modulator 212 is also coupled to a media server 211 manufactured by Formation, for example, by three video lines (only one of which is shown in FIG. 3), and to a video reproducer 227 (or video cassette player 227), such a triple deck player manufactured by TEAC, for example, by three video lines (only one of which is shown in FIG. 3).

The media server 211 stores video data and executable programs in MPEG format and includes a quadrature amplitude modulation (QAM) circuit that modulates the video data and/or executable programs in the MPEG format into QAM RF signals. By using 64-quadrature amplitude modulated encoding of the MPEG data, multiple video streams (up to 10) or multiple executable programs can occupy the same frequency spectrum as one RF channel. Three independent QAM RF signals, each containing multiple executable programs or multiple video streams, are generated by the media server 211 and supplied to the video modulator 212 using the three video lines.

The video cassette player 227 has three 8 mm Hi-8 video cassette players that play videos stored in NTSC format to generate NTSC video streams. Three independent NTSC video streams are generated respectively onto the three video lines. The three video lines used with the media server 211 are pin for pin compatible and thus interchangeable with the three video lines used with the video cassette player 227.

The video modulator 212 has 24 channels, capable of receiving 24 inputs and modulating the 24 inputs into a single RF signal having 24 RF channels. In the preferred embodiment, the 8 HSDL inputs are modulated into 8 RF channels, the 3 video inputs from the media server 211 and the 3 video inputs from the video cassette player 227 are modulated into 6 RF channels. Although a 24-channel video modulator is depicted here, the present invention can be implemented with a video modulator with any number of channels, so long as the number of channels provided by the video modulator is greater than or equal to the sum of its inputs.

The head end equipment 200 further comprises first and second passenger entertainment system controllers (PESC-A, PESC-V) 224a, 224b, that comprise video, audio and phone processors. Although only one unit is shown, in certain configurations, primary and secondary PESC-A controllers 224a may be used. The outputs of the video modulator 212 are routed through the second passenger entertainment controller (PESC-V) 224b to the first passenger entertainment system controller (PESC-A) 224a. The first passenger entertainment system controller (PESC-A) 224a is used to distribute video and control signals by way of an RF cable 215 and an ARCNET (RS-485) network 216, respectively to area distribution equipment 210 that routes the video and data to the passenger seats 123 as shown in FIG. 2.

The first passenger entertainment system controller (PESC-A) 224a is coupled to the cabin file server 268 by way of the ARCNET network 216, and is coupled to the primary access terminal (PAT) 225 by way of the ARCNET network 216 and the second passenger entertainment system controller (PESC-V) 224b by way of an RF cable 215. The first passenger entertainment system controller (PESC-A) 224a is also coupled to a public address (PA) system 222, to an audio tape reproducer (ATR) 223, and to a cabin telephone system (CTS) 239. The audio tape reproducer 223 may be one manufactured by Sony or Matsushita, for example. The cabin telephone system 239 may be systems manufactured by AT&T or GTE, for example. Signals associated with the cabin telephone system 239 are routed through the system 100 by means of a CEPT-E1 network 219.

The first passenger entertainment controller 224a is coupled to a area distribution box 217 by way of the RF cable 215 and the ARCNET network 216. The area distribution box 217 is coupled to other area distribution boxes (not shown) with RF cable 215, the ARCNET network 216, and the CEPT-E1 network 219 to form the area distribution equipment 210. The area distribution boxes 217 are used to distribute digital and analog video streams to the audio-video seat distribution units 231 at the passenger seats 123. The area distribution boxes 217 couple signals modulated by the video modulator 112 to the passenger seats 123 of the aircraft 111.

One audio-video seat distribution unit 231 is provided for each block of seats 123 (e.g., block of three seats), and a seat controller card 269 (see FIG. 6) is provided for each seat 123. Each seat controller card 269 contains a tuner and related circuitry that demodulates the modulated RF signals to produce NTSC video and audio signals for display, and demodulates and decompresses the quadrature amplitude modulated MPEG-compressed signals to produce either NTSC video and audio signals for display or application program code, e.g., operating system code or game program code, for execution.

Figure 4:
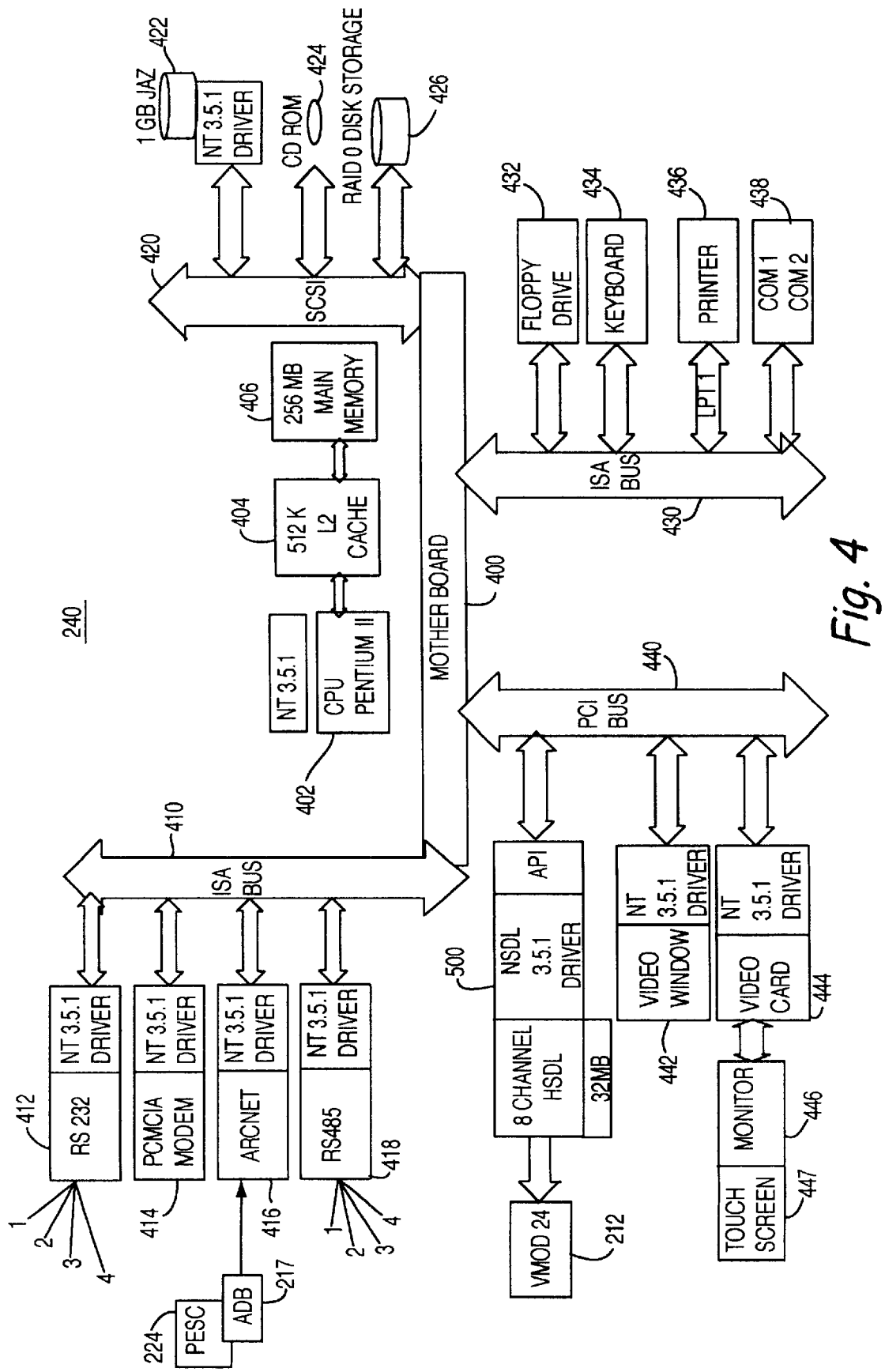
FIG. 4 is a block diagram of a system control unit of the vehicle entertainment system.

FIG. 4 is a detailed block diagram of the system control unit 240. Conventionally, the primary access terminal and the cabin file server are provided separately in an in-flight entertainment system, but in the vehicle entertainment system 100 of the present invention, the primary access terminal 225 and the cabin file server 268 are integrated into a single unit, referred to as the system control unit 240.

The system control unit 240 includes and is controlled by a main processor 402 (Pentium II type) that is programmed to run in a Windows NT environment. The main processor 402 is mounted on the motherboard 400 and is connected to a cache 404 and a random access memory (RAM) 406. The motherboard 400 has implemented thereon four buses, a first ISA bus 410, an SCSI bus 420, a second ISA bus 430, and a PCI bus 440.

The first ISA bus 410 provides a connection to communication interfaces, including an RS-232 communication interface 412, a modem interface 414, an Arcnet interface 416, and an RS-485 interface 418. The Arcnet interface 416, as illustrated, provides a communication link with, inter alia, the area distribution box 217 and the passenger entertainment system controller 224.

Storage devices for the system control unit 240 are connected to the SCSI bus 420. They include a removable hard disk drive 422, a CD-ROM drive 424, and a RAID 0 drive 426.

Peripheral devices providing an operator interface are connected to the second ISA bus 430. They include a floppy drive 432, a keyboard 434, a printer 436, and communication ports (COM 1 and COM 2) 438.

The PCI bus 440 provides a connection to the high-speed download (HSDL) card 500, a video window 442, and a video card interface 444 for a monitor 446. The monitor 446 is equipped with a touch panel 447. Operator inputs are made by the keyboard 434 and/or the touch panel 447.

Figure 5A:
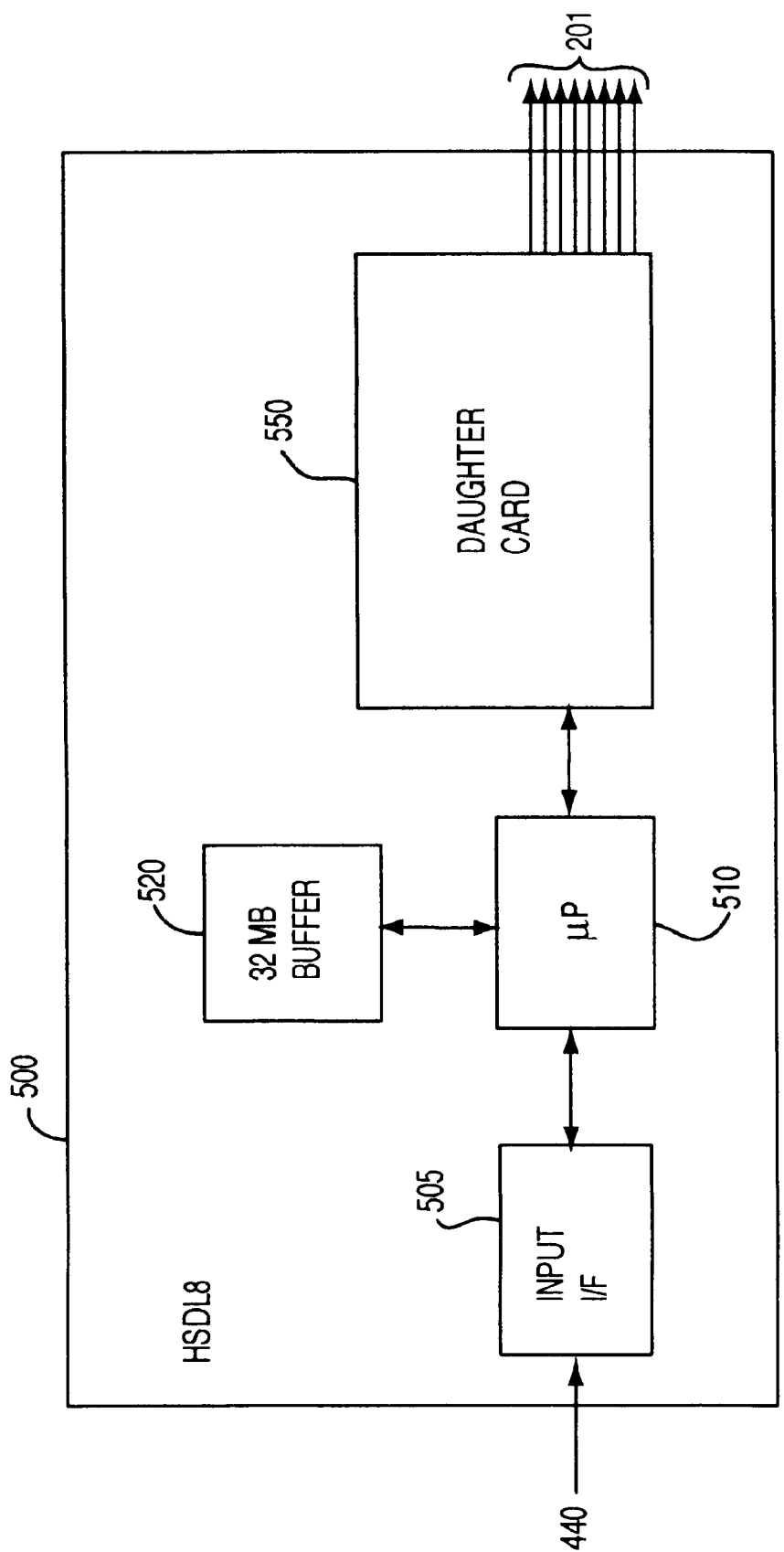
FIG. 5A is a block diagram of a high-speed download card implemented in the system control unit of the vehicle entertainment system.

As illustrated in FIG. 5A, the HSDL card 500 includes a PCI input interface 505 connected to the PCI bus 440, a microprocessor 510 (an I960 processor manufactured by Intel Corp., for example), a 32 MB buffer 520, and a daughter card 550 having 8 outputs connected respectively to the 8 HSDL lines 201. The microprocessor 510 is programmed to run in a Windows NT environment and to generate parallel streams of synchronous data representing application programs requested by the seat controller cards 269. The microprocessor 510 uses the buffer 520 to store the requested application programs for subsequent retrieval. Retrieval from of the application program from the buffer 520 relieves the main processor 402 from any data processing during the download process. When an application program requested by a seat controller card 269 is not in the buffer 520, the main processor 402 retrieves the requested program from one of its storage devices 422, 424, or 426 and transmits it to the microprocessor 510 over the PCI bus. The microprocessor 510 receives the requested program and stores it in the buffer 520 for subsequent transmission.

Using the buffer 520, the processing task related to transmitting a continuous stream of data through one or more of the HSDL lines 201 is performed solely by the HSDL processor 510. The main processor 402 is relieved of this task, which requires continual data processing from beginning of data transmission to the end of data transmission. The processing tasks that are performed by the main processor 402 now include: download request management, buffer management, and channel management as described below with reference to FIG. 9, and the retrieval of the requested program from one of its storage devices. These tasks do not require continual processing of data and so the main processor 402 is now able to more flexibly allocate its processing resources to other tasks.

Figure 5B:
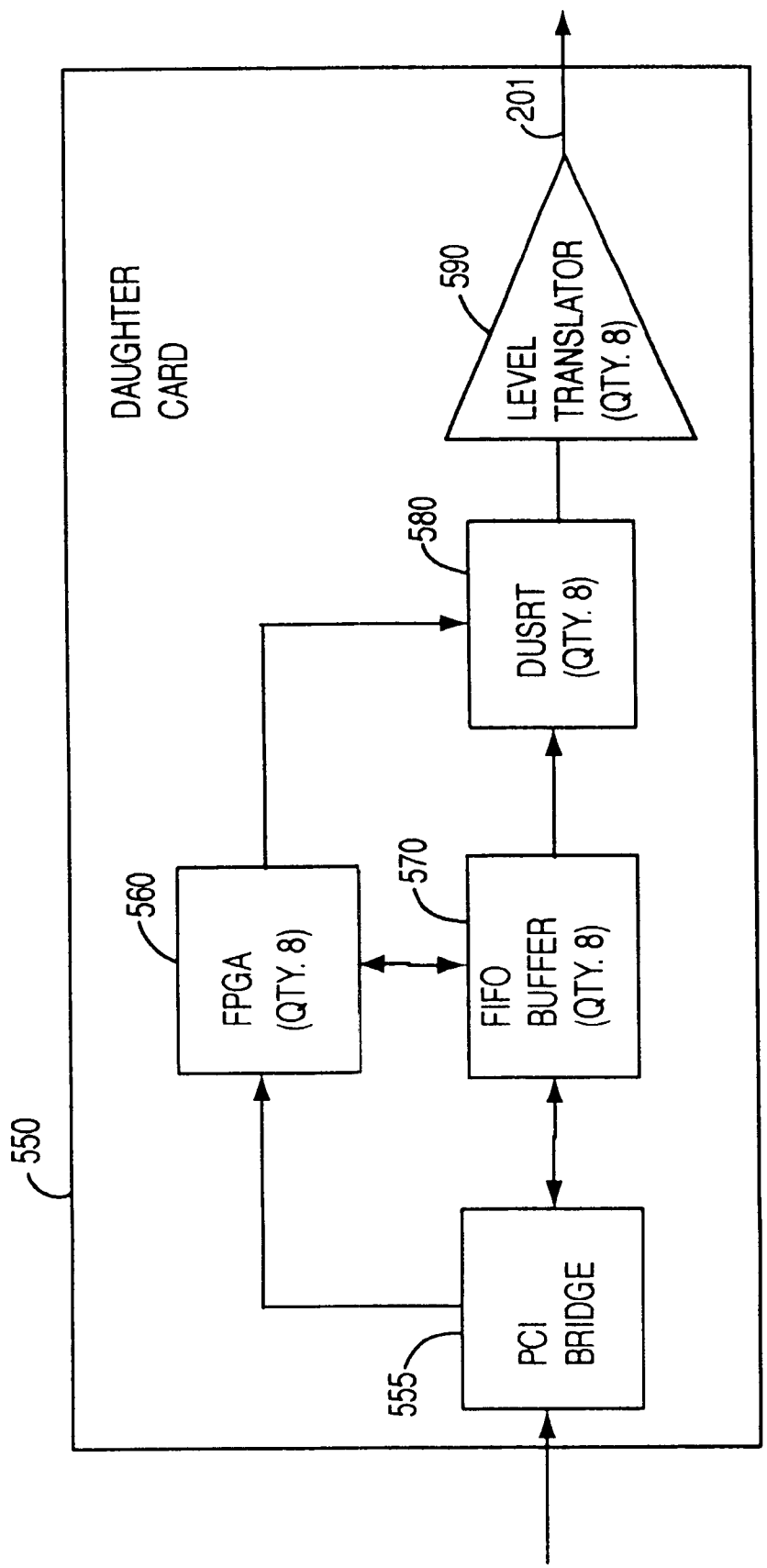
FIG. 5B illustrates a daughter card of the high-speed download card of FIG. 5A in more detail.

The daughter card 550 is responsible for conditioning the application program data it receives from the microprocessor 510 to generate 8 synchronous data streams, each comprising a 1-volt peak-to-peak signal in accordance with an HDLC protocol and transmitting at 1.228 Mbits/sec. The daughter card, shown in FIG. 5B, includes a PCI bridge 555 (I9080 PCI bridge manufactured by Intel Corp.), eight FIFO buffers 570, eight dual universal synchronous receiver-transmitters (DUSRTs) 580, and eight level translators 590. Only one port of the DUSRT is used for input, and thus eight such DUSRTs have been used in this implementation.

The eight DUSRTs 580 are Z85230 manufactured by Zilog Corp., and convert a single parallel data stream that is output from the microprocessor 510 into eight serial self-clocking data streams as governed by the HDLC protocol. The eight FIFO buffers 570 are IDT723644 manufactured by IDT Corp., and are coupled respectively to the eight DUSRTs 580 and function as the data synchronization buffers between the output side of the microprocessor 510 and the input side of the DUSRTs 580. The eight field programmable gate arrays (FPGAs) 560 monitor the PCI bridge 555, the FIFO buffers 570, and the DUSRTs 580, and control the data synchronization between the output side of the micropro-cessor 510 and the input side of the DUSRTs 580. The eight level translators 590 are supplied respectively with the outputs from the eight DUSRTs 580 and convert the eight DUSRT outputs respectively into eight 1-volt peak-to-peak signals into 75 ohms (thus looking like a video signal), each of which is carried on one of the eight HSDL lines 201.

Figure 6:
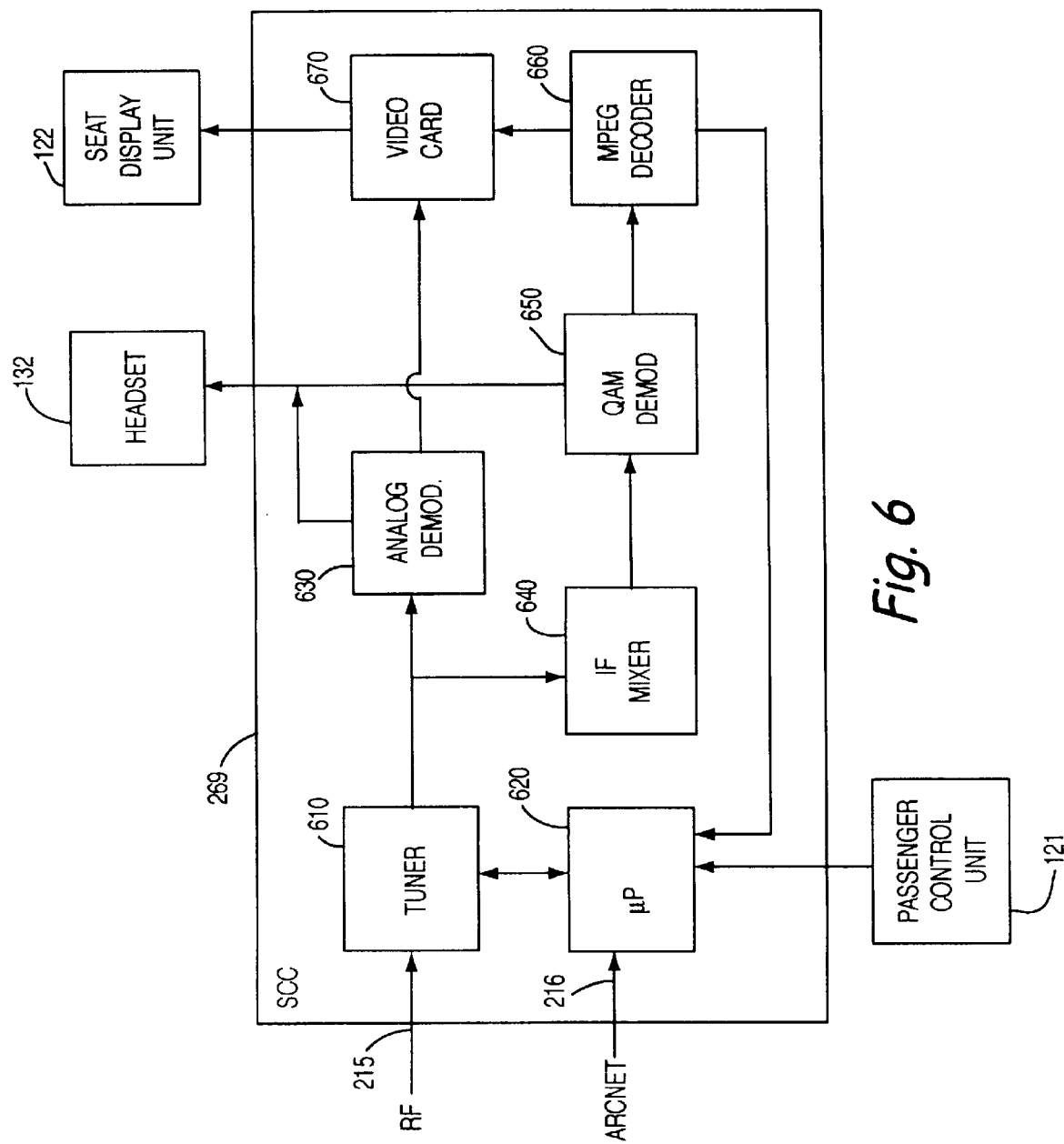
FIG. 6 is a block diagram of a seat controller card of the vehicle entertainment system.

FIG. 6 is a block diagram of exemplary seat controller card 269 in accordance with a preferred embodiment. The seat controller card 269, which is provided for each passenger seat 123, is connected to the seat display unit 122 with a headset 132, and is controlled by the passenger control unit 121. The seat controller card 269 includes a tuner 610 that extracts a signal from a particular channel of the distributed RF signal. The particular channel setting is made by a microprocessor 620 and may correspond to a passenger selection using the passenger control unit 121 or an application program selection.

The microprocessor 620 is also informed over the ARCNET network whether the signal contained in a particular channel is a baseband signal or an intermediate frequency (IF) signal. If the extracted signal is a baseband signal, containing NTSC video streams, an analog demodulator 630 is used to demodulate the NTSC video streams to produce NTSC video signals for display using a video card 670 and audio signals for the headset 132. If the extracted signal is an IF signal containing QAM RF signals, an IF mixer 640, QAM demodulator 650 and an MPEG decoder 660 are used to mix, demodulate and decompress the QAM MPEG-compressed signals to either produce NTSC video signals for display using a video card 670 and audio signals for the headset 132, or an application program code in a format executable by the microprocessor 620.

Figure 7:
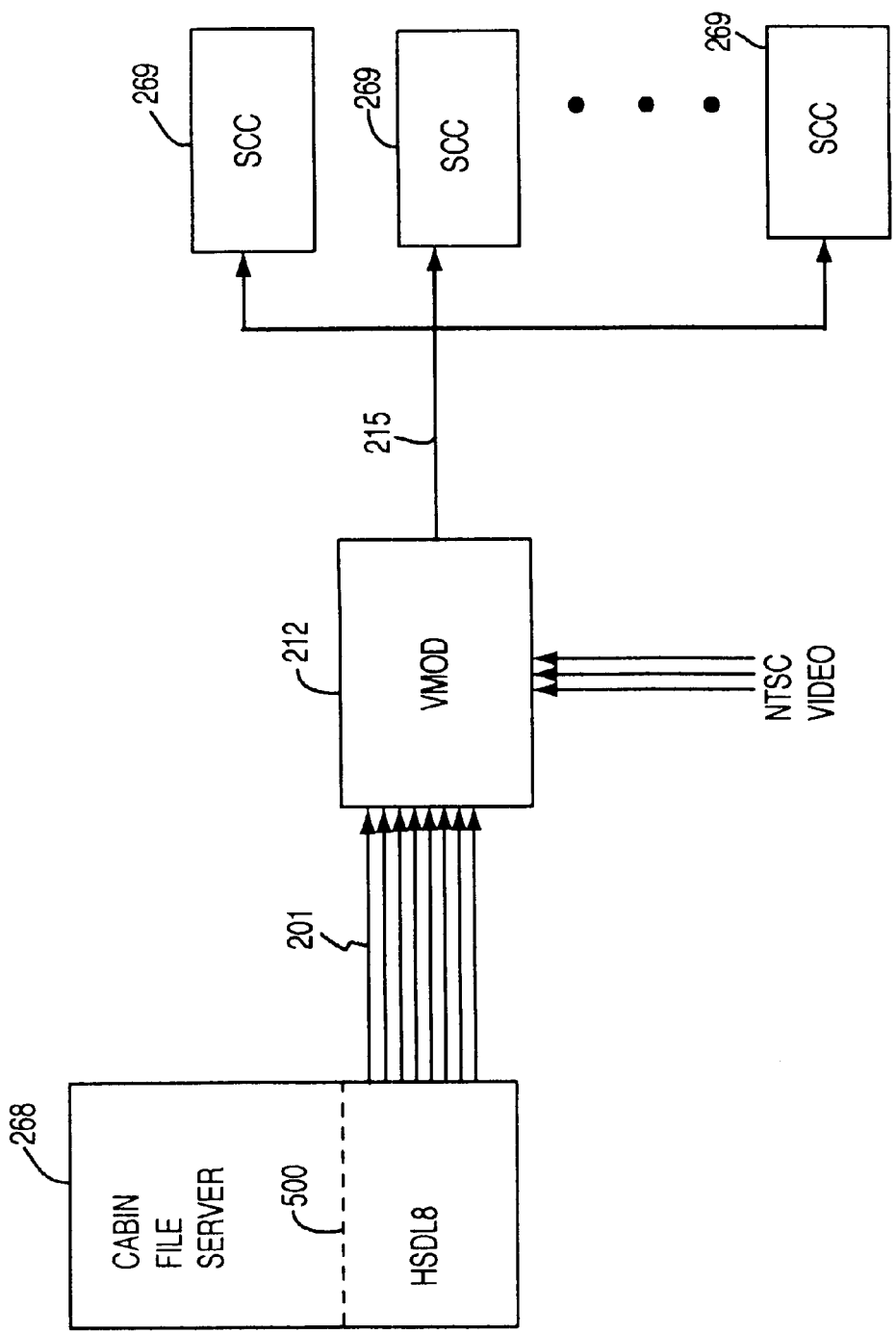
FIG. 7 is a simplified block diagram of the vehicle entertainment system in accordance with a first embodiment.

FIG. 7 shows a simplified diagram of the vehicle entertainment system 100 and illustrates the download path from the cabin file server 268 to the SCCs 269 in accordance with a first embodiment of the invention. The download path includes the eight HSDL lines 201 between the HSDL card 500 of the cabin file server 268 and the video modulator 212 and an RF cable 215 between the video modulator 212 and the SCCs 269. For simplicity, intervening equipments such as the passenger entertainment system controllers 224a, 224b and the area distribution box 217 have been omitted.

The video modulator 212 receives data signals from the HSDL card 500 and in addition thereto, NTSC video signals from the video reproducer 227, and RF modulates these signals into a plurality of RF channels. The SCCs 269 receive the RF modulated signal and are tuned to extract signals from one of the RF channels.

Figure 1:
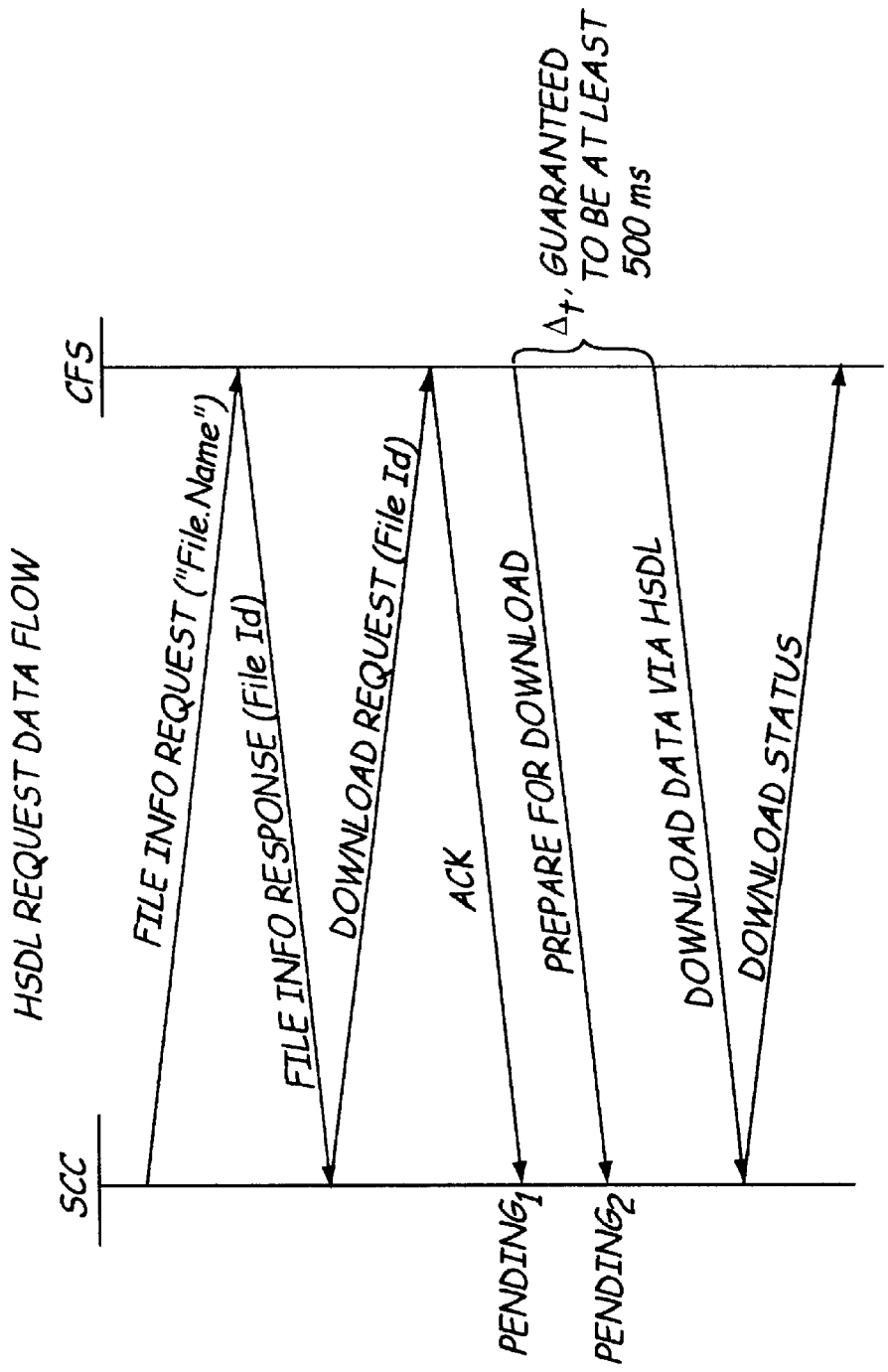
FIG. 1 illustrates the steps carried out in performing a download request in the prior art.

For example, if program A is in channel 1, the SCC 269 that requested program A tunes to channel 1 and starts receiving program A from channel 1. However, if program A is in channel 1, but another SCC 269 requested program A too late to tune to receive from channel 1 (i.e., outside the 500 ms window of FIG. 1), then program A is transmitted from the cabin file server 268 to the video modulator 212 over an unused one of the 8 HSDL channels 201 and is RF modulated into an unused RF channel X by the video modulator 212. The late-requesting SCC 269 receives program A from channel X by tuning to channel X.

In a similar manner, different programs A and B may be RF modulated by the video modulator 212 into different channels and received by the SCCs 269 (i.e., different SCCs) at the same time or overlapping times. As a result, one of the SCCs 269 may tune to one channel to receive program A while another of the SCCs 269 is tuned to another channel to receive program B.

In an exemplary embodiment, executable program code is transmitted over the HSDL lines 201 and modulated onto the RF cable. These program codes may correspond to computer games, internet access code, word processing code, data base management code, spreadsheet code and the like.

Figure 8:
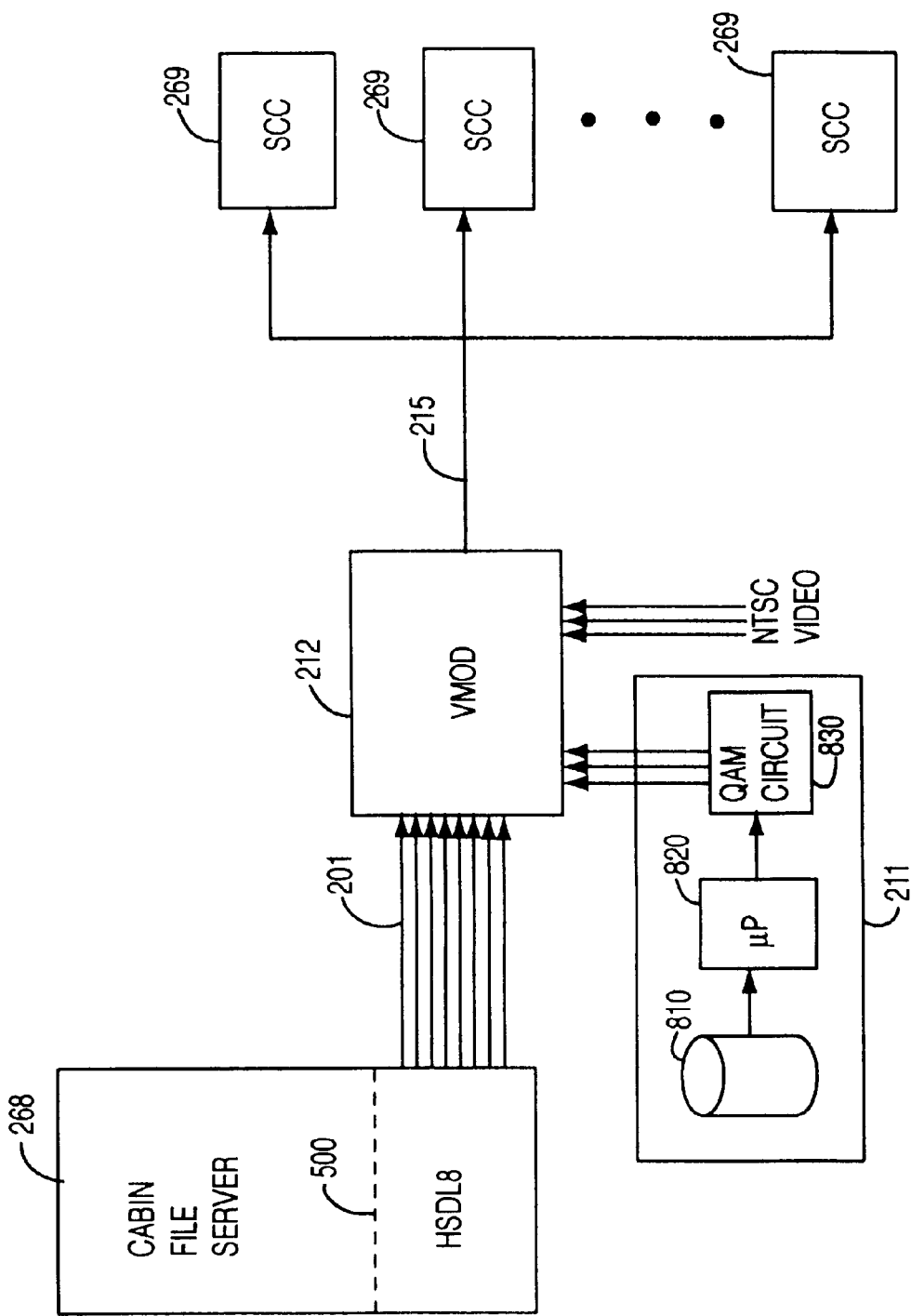
FIG. 8 is a simplified block diagram of the vehicle entertainment system in accordance with a second embodiment.

FIG. 8 is a simplified diagram of the vehicle entertainment system 100 in accordance with a second embodiment of the invention. The second embodiment is the same as the first embodiment except that a media server 211 is provided in addition to the HSDL card 500. The microprocessor 820 reads MPEG-formatted data from the storage device 810, which may be an optical or hard disk drive, and supplies it to the QAM circuit 830 which produces QAM RF signals. These QAM RF signals are supplied to the video modulator 212 which additionally receives three NTSC video signals from the video reproducer 227, and the 8 HSDL inputs from the HSDL card 500. The SCCs 269 receive the RF modulated signal and are tuned to extract signals from one of the RF channels.

At the SCCs 269, as explained earlier, if QAM RF signals are extracted, then a QAM demodulator is used to QAM demodulate these signals and an MPEG decoder is used to decompress the QAM demodulated signals. The decoded signal may include one or a plurality of NTSC video signals or an application program in an executable format. As a result, the SCCs 269 can select from a plurality of video signals or programs by tuning to one RF channel.

Figure 9:
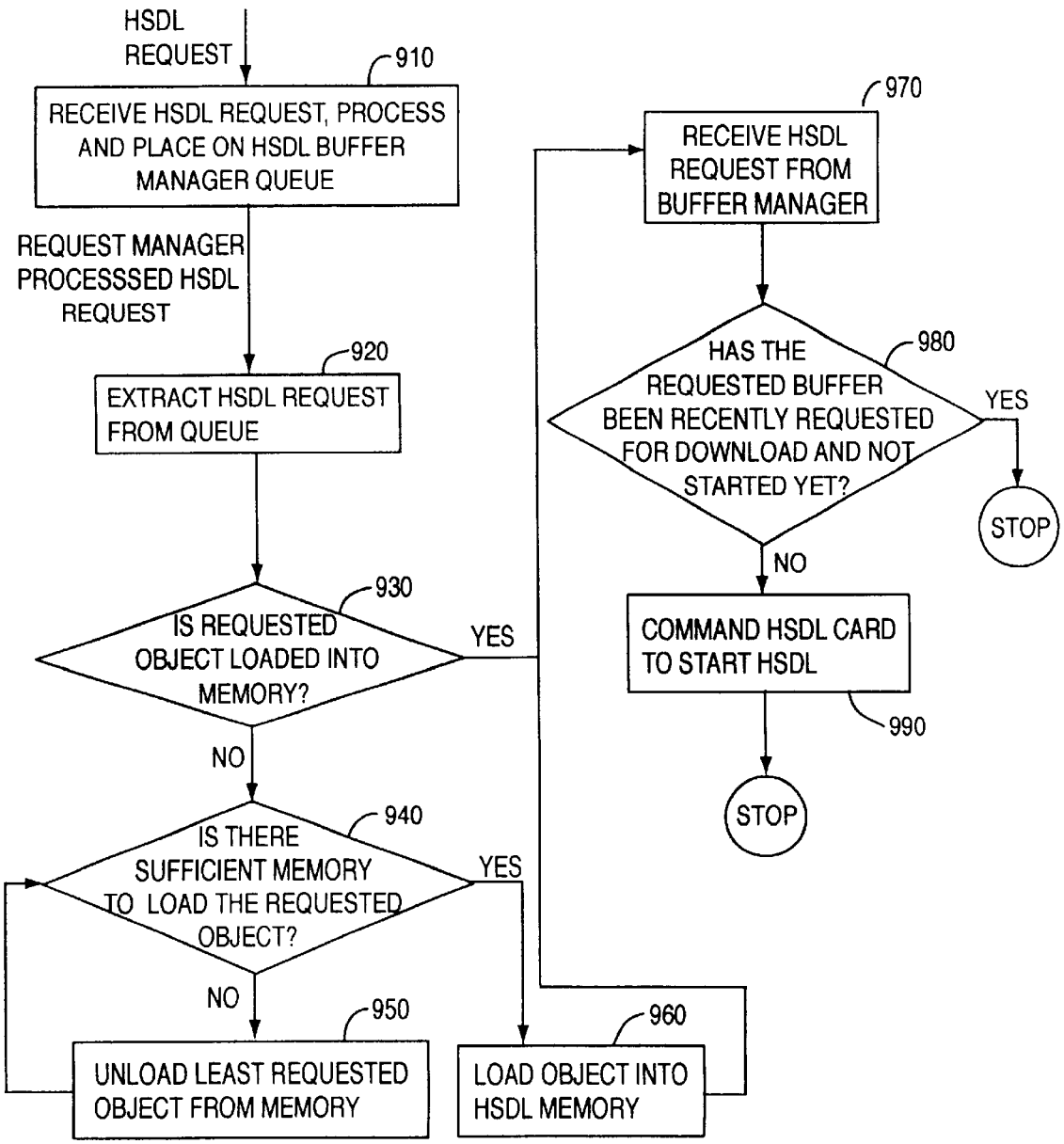
FIG. 9 is a flow diagram illustrating the steps carried out by the vehicle entertainment system in accordance with the invention.

FIG. 9 is a flow diagram illustrating the steps carried out by the vehicle entertainment system 100 in accordance with the invention. There are three software modules that carry out the steps illustrated in FIG. 9. They are the multi-channel HSDL request manager, the multi-channel HSDL buffer manager, and the multi-channel HSDL channel manager. These software modules are processed by the main processor 402.

The request manager receives an application program download request in Step 910 and places it on a buffer manager input queue. Before placing it on the queue, however, the request manager checks to see if it can accommodate this request using an earlier download request by examining the buffer manager input queue. For example, if the same request is in the buffer manager input queue, this request is processed together with the earlier download request.

In Step 920, the buffer manger extracts the download request from the request manager from the buffer input queue and checks to see if the requested program is already loaded into the buffer 520 (Step 930). The check is performed using a table that the buffer manager maintains. The table includes information about the remaining buffer memory, application programs currently stored in the buffer memory, the buffer number assigned to the currently stored application programs, and the usage frequency of the currently stored application programs. If the requested program is not currently stored in the buffer, the buffer manager examines the buffer 520 to see if there is sufficient.memory to load the requested program (Step 940). If memory is insufficient, a least requested program is unloaded from the buffer 520, i.e., the buffer space corresponding to the least requested program is made available (Step 950). The unloading step is repeated with the next least requested program so long as there is insufficient memory. When sufficient memory becomes available, the requested program is assigned a buffer number, and the main processor 402 commands the HSDL processor 510 to load it into the buffer 520 (Step 960). Thereafter, the download request is placed in the channel manager input queue. If, in Step 930, it has been determined that the requested program is already stored in the buffer 520, the download request is placed in the channel manager input queue and Steps 940, 950, and 960 are not executed.

In Step 970, the channel manager retrieves the download request from the channel manager input queue and determines if an earlier request involved the same buffer number and has started commencing download (Step 980). If the earlier request did involve the same buffer number and the download has not commenced, the channel manager does not issue a download command to the HSDL card 500 since the current request is duplicative of the earlier request. Otherwise, the channel manager issues a download command to the HSDL card 500, in particular to the HSDL processor 510 of the HSDL card 500 (Step 990).

While particular embodiments according to the invention have been illustrated and described above, it will be clear that the invention can take a variety of forms and embodiments within the scope of the appended claims.

We claim:

1. In a vehicle entertainment system having a plurality of seat controller cards (SCCs) executing programs downloaded from a system controller, a method of managing high speed download (HSDL) requests from the SCCs, said method comprising the steps of:

receiving a HSDL request from a SCC for a requested program;

processing the HSDL request;

placing the HSDL request on a buffer manager input queue;

extracting the HSDL request from the buffer manager input queue;

checking to see if the requested program is stored in a download buffer;

placing the HSDL request in the channel manager input queue if the requested program is stored in the download buffer;

examining the download buffer to see if there is sufficient memory to load the requested program if the requested program is not in the download buffer;

unloading a least requested program from the download buffer if memory space is not available;

commanding the HSDL processor to load the requested program into the download buffer when sufficient memory is available;

placing the download request into the channel manager input queue when the requested program is loaded into the download buffer;

retrieving the download request from the channel manager input queue;

determining if an earlier request involving the same buffer number has started to download; and downloading the requested program using at least one RF channel of a modulated RF signal that is distributed to the SCCs if the earlier request has not started to download.

2. The method according to claim 1, wherein the step of processing the HSDL request further comprises the steps of:

examining a buffer manager input queue to see if a same earlier HSDL request from another SCC is present;

placing the HSDL request on the buffer manager input queue if the same earlier request is not present; and processing the HDSL request and the same earlier HSDL request if one is present in the buffer manager input queue.

3. The method according to claim 1 wherein the step of unloading a least requested program is repeated until sufficient memory is available.

4. The method according to claim 1, wherein the step of downloading includes the steps of:

delivering the executable programs from the system controller to a modulator;

RF modulating the executable programs at the modulator to produce the modulated RF signal carrying the executable program in more than one RF channel.

5. The method according to claim 4, wherein the executable programs are delivered from the system controller to the modulator by way of a plurality of parallel data paths.

6. The method according to claim 5, further comprising the step of confirming that one of the parallel data paths is available and delivering the requested program by way of the available parallel data path.

* * * * *